April 21, 1925.

W. THOMPSON

TIRE BUILDING TOOL

Filed June 8, 1921

1,534,038

INVENTOR
WILLIAM THOMPSON
BY Ernest Hopkinson
HIS ATTORNEY

Patented Apr. 21, 1925.

1,534,038

UNITED STATES PATENT OFFICE.

WILLIAM THOMPSON, OF DETROIT, MICHIGAN, ASSIGNOR TO MORGAN & WRIGHT, A CORPORATION OF MICHIGAN.

TIRE-BUILDING TOOL.

Application filed June 8, 1921. Serial No. 475,923.

*To all whom it may concern:*

Be it known that I, WILLIAM THOMPSON, a citizen of the United States, residing at Detroit, county of Wayne, and State of Michigan, have invented a certain new and useful Tire-Building Tool, of which the following is a full, clear, and exact description.

This invention relates to a tire building tool and more particularly to a cutter for trimming the margins or skirts of treads.

In the manufacture of pneumatic tire casings, after the carcass has been built up of plies of rubberized fabric, cushion strips, breaker strips, etc., it is very often the practice to apply the tread that has previously been calendered roughly to shape and roll it down firmly onto the carcass. Ordinarily the tread stocks are made a little wider than necessary and the excess trimmed off.

Heretofore this trimming has been effected, after lightly scratching lines on the opposite side walls of the carcass where the tread stock is to terminate and rolling the tread down thereto, by cutting off the excess width with a pair of shears or a V-shaped cutter. The nicety with which the cut was made to the lines marked on the carcass depended, of course, upon the skill of the operator and the time he gave to the task and of course irregularities occurred.

The present invention aims to provide a tool by which the excess width of tread may be trimmed off at the opposite sides of the tire neatly and cleanly, and concentrically, the latter insuring an even distribution of the rubber and more uniform flow thereof in the subsequent mold curing.

Briefly, without limiting intention, the invention consists in a unitary hand tool, having a cutter whose depth and place of severance is governed by associated gages or guiding devices, one of which at least preferably tracks the carrier or core on which the tire is mounted or built.

A preferred embodiment of the invention is illustrated in the accompanying drawings in which.

Figure 1:
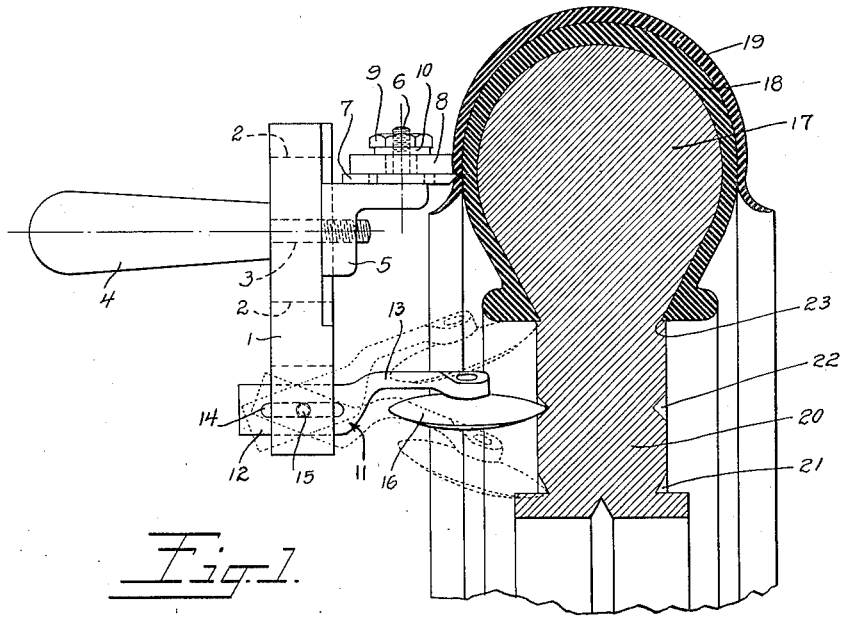
Fig. 1 is a side elevation of the tool in operative relation to a tire and the carrier on which it has been built, the carrier shown being of the core type and having its inwardly projecting flange enlarged out of the usual proportions to better illustrate the invention.

As shown in the drawings, the tool comprises a block 1 which is slotted as indicated at 2 to pass the reduced and threaded end 3 of the handle 4 by which a bracket or angle 5 is adapted to be adjustably clamped to the block 1. That flange of the angle 5 which projects at substantially right angles from the block 1 is provided with an upstanding threaded stud 6 which passes through slots in a knife 7 and a super-imposed roller 8, a nut 9 and bushing 10 being provided to clamp the knife and roller in any desired adjusted position but so as to permit free rotation of the roller. By suitable relative adjustment of the roller 8 and knife 7, the depth of cut may be gaged or limited.

In the lower bifurcated end of the block 1 is mounted a second gage or guiding device indicated generally by the numeral 11. This consists of a T-shaped member having a central arm 12 and lateral arms 13, the former being slotted as indicated at 14 to receive the stem of a thumb-screw 15 by which it is adjustably secured or anchored to the block 1. On the lateral arms 13 are rotatably mounted spaced independent rollers 16 whose axes converge (in the operative position shown in the drawings) towards the axis of the carrier 17 on which the tire 18 and tread 19 are being assembled. As shown, the carrier is of the core type, having an inwardly projecting flange 20 (exaggerated in size in the drawings) and this flange is usually equipped, or may be equipped, with ribs or grooves 21, 22 and 23, arranged concentric with the core. Into any one of the grooves or guiding recesses 21, 22 and 23, rollers 16 are adapted to be positioned and when so held by the operator, who grasps the handle 4, the cutter 7 is guided in a path concentric to the carrier 17 and consequently, also the tire. Ordinarily the carrier 17 is rotated and the tool held stationary but the conditions may be reversed.

Figure 2:
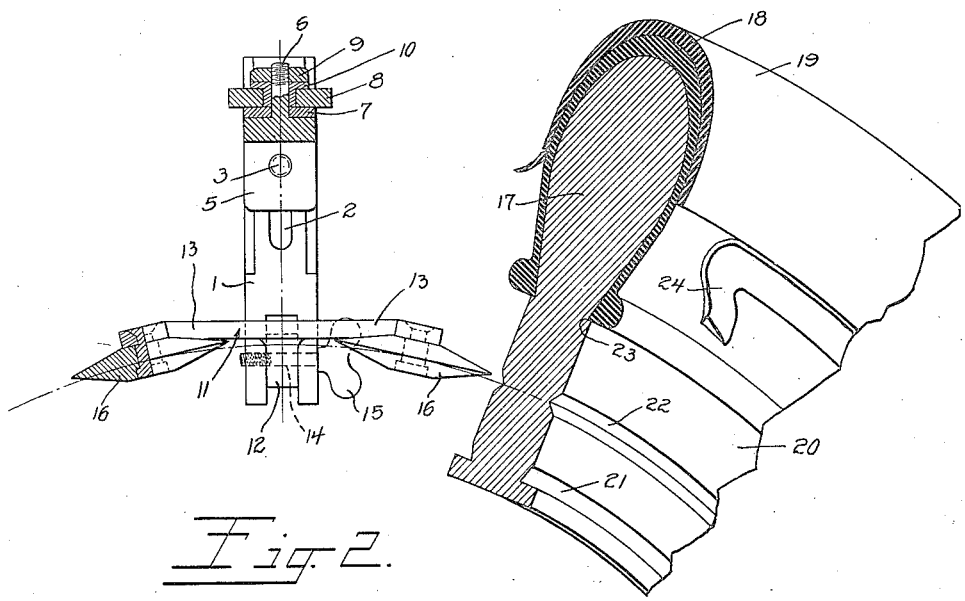
Fig. 2 is a side elevation of the same with the carrier and tire omitted from in front of the tool, and with the latter shown partly in section.

In operation, the depth of cut will be governed by the projection of the knife 7 beyond the roller 8. Ordinarily the knife will be set so as to just cut through the tread stock but there is usually a stratum of rubber beneath the tread and consequently, no danger of severing the fabric plies which lie therebeneath. It is not necessary however to completely sever the tread, it may be cut substantially through and pulled off by hand as indicated at 24 in Fig. 2. The roller 8 in addition to gauging the depth of cut acts as a presser and firmly unites the cut margins of the tread to the underlying carcass.

It will be obvious that various changes may be made in the details of construction without departing from the principles of the invention. The knife, for instance, may be made circular in form and adjustably mounted on an eccentric stud screw. The rollers 16 are preferably arranged tangent to a circle of about the average size of core, it being understood that the cores or carriers 17 vary in size with the tires built or mounted thereon. Obviously guiding fingers might be substituted for the rollers 16 and only one of the fingers or rollers 16 could be used, but in this latter case, concentric cutting of the excess tread width would be less certain and reliable, the operator being free and liable to cant the knife 7 more or less from fixed radial relation with the carrier insured in the preferred construction. The tool by obvious modification could be adapted to co-operate with a carrier of the "bull" or "sealing ring" type and such use is contemplated as well as all others to which it is adapted without substantial modification in principle. Reference should therefore be made to the claims for an understanding of the scope of the invention which is not intended to be confined to the specific details of construction illustrated and described.

Having thus described my invention, what I claim and desire to protect by Letters Patent is:

1. A hand tool for trimming a tire on a carrier, having a knife, and a depth gage in combination with, means for making a cut with the knife in substantially predetermined concentric relation to the carrier.

2. hand tool for trimming a tire on a carrier, having a knife and a gage adjacent the knife for regulating the depth of cut in combination with a pair of guiding devices adapted in co-operation with the carrier to make the cut concentric.

3. A unitary hand tool for trimming a tire mounted on a carrier, having a knife, a roller supported immediately adjacent the knife and with its periphery in rear of the cutting edge of the knife to regulate the depth of cut, and a guiding device supported laterally in fixed spaced relation from the knife, said guiding device being adapted to track the carrier and insure the cut being made concentric.

4. A unitary hand tool for trimming a tire mounted on a carrier, having a knife, a roller supported immediately adjacent the knife and with its periphery in rear of the cutting edge of the knife to regulate the depth of cut, and a pair of rollers spaced laterally of the knife and adapted to track the carrier.

5. A unitary hand tool for trimming a tire mounted on a rotatable carrier, having a knife, a gage adjacent the knife for regulating the depth of cut, and means fixedly spaced laterally of the knife for guiding it during a cutting operation in a path concentric to the carrier, said last named means including spaced rollers whose axes are convergent towards the axis of the carrier.

6. A unitary hand tool for trimming a tire mounted on a rotatable carrier, having a knife, a gage adjacent the knife for regulating the depth of cut, and means fixedly spaced laterally of the knife for guiding it during the cutting operation in a path concentric to the carrier, said last named means including spaced rollers whose independent axes are convergent toward the axis of the carrier and on opposite sides of a line connecting the knife and the axis of the carrier.

7. A unitary hand tool for trimming a tire tread in place on a carcass which is mounted on a carrier having in combination, a cutting member, a gauge adapted to contact with the tread and regulate the depth of cut, and a second gauge adapted to contact with the carrier below the beads of the tire and locate the cut concentric with the carrier.

8. A unitary hand tool for trimming a tire tread in place on a carcass which is mounted on an annular carrier having in combination, a knife, a gauge adjacent the knife and spaced knife guiding devices, the planes of whose body portions are substantially tangent a circle which is concentric to the tire.

Signed at Detroit, Michigan, this 26th day of May, 1921.

WILLIAM THOMPSON.